United States Patent [19]

Hedgewick

[11] Patent Number: 5,240,719
[45] Date of Patent: Aug. 31, 1993

[54] ONE PIECE SAFETY CAP MOLDING APPARATUS

[75] Inventor: Peter Hedgewick, Windsor, Canada

[73] Assignee: Caran Engineering, Nassau, The Bahamas

[21] Appl. No.: 767,226

[22] Filed: Sep. 27, 1991

Related U.S. Application Data

[63] Continuation-in-part of Ser. No. 402,555, Sep. 5, 1989, Pat. No. 5,053,182.

[51] Int. Cl.⁵ .............................................. A21D 13/08
[52] U.S. Cl. ................................. 425/556; 425/441; 425/449; 425/809
[58] Field of Search .............. 425/556, 542, 383, 554, 425/809, 438, 444, 441; 249/59, 67; 215/222

[56] References Cited

U.S. PATENT DOCUMENTS

| Re. 27,156 | 7/1971 | Hedgewick | 215/222 |
| 3,482,814 | 12/1969 | Hedgewick | 249/67 |
| 3,618,170 | 11/1971 | Owens | 249/59 |
| 4,444,327 | 4/1984 | Hedgewick | 215/222 |
| 5,053,182 | 10/1991 | Hedgewick | 264/318 |

Primary Examiner—Bernard Nozick
Attorney, Agent, or Firm—Gifford, Groh, Sprinkle, Patmore and Anderson

[57] ABSTRACT

An apparatus for molding a cap (16) including a base portion (18) and peripheral skirt (20) extending axially from and about the base portion (18) includes an outer surface forming mold (44) for forming an outer surface of the base portion (18) and the peripheral skirt (20) and an inner surface forming mold (46) seatable within the outer surface forming mold (44) for forming an inner surface of the base portion (18) and the peripheral skirt (20). The outer surface forming mold (44) is retractable from seated engagement with inner surface forming mold (46) for exposing the moded cap (16) therebetween. The inner surface forming mold (46) includes a core portion (52) and lug forming mold portions (54) disposed radially peripherally thereabout, the lug forming mold portions (54) being able to project axially from and retract radially inwardly relative to the central core portions (52) for releasing and ejecting the molded cap (16)from the inner surface forming mold (46).

7 Claims, 3 Drawing Sheets

ONE PIECE SAFETY CAP MOLDING APPARATUS

BACKGROUND OF THE INVENTION

This is a continuation in part application of application Ser. No. 402,555, filed Sep. 5, 1989, now issued as U.S. Pat. No. 5,053,182.

FIELD OF THE INVENTION

This invention relates generally to safety closure and container assemblies and methods and apparatus for making the same. In particular, the present invention is concerned with improvements of apparatus for making safety closure and container assemblies and the closures wherein it is necessary to form a cap including a skirt portion having radially inwardly extending locking lugs.

DESCRIPTION OF THE RELATED ART

Safety closures and container assemblies have been developed to reduce the number of accidental poisonings resulting from young children who have access to unsafe medicines, drugs, household chemicals, and other products. For example, the U.S. Pat. No. 3,482,814 to Hedgewick, issued Dec. 9, 1969 discloses a mold apparatus for making safety caps having a base, peripheral flange and a plurality of radially inwardly extending lugs on the inner surface of the peripheral flange adapted to engage notches on projections of a container. An apparatus is disclosed for molding the cap member, the apparatus including a core body fixed to a core retainer plate and a stripper and core ring which is removable axially relative to the core retainer place for axially displacing a cap formed on the core body. A plurality of circumferentially spaced pins are yieldingly urged upwardly by a spring to in turn tend to urge the stripper and core ring axially upwardly thereby displacing a molded cap from the core member.

Reissue U.S. Pat. No. 27,156 to Hedgewick, issued Jul. 20, 1971 also discloses a safety cap and container assembly. The U.S. Pat. No. 4,444,327 to Hedgewick, issued Apr. 24, 1984, discloses a tight vial assembly with a one piece cap. The cap includes a base portion and skirt portion extending axially therefrom the lugs extending radially inwardly from the skirt portion. A yieldable sealing portion perfects a seal with the lip of the container as it is urged against the lip of the container during the engagement of the lugs with the outer surface of the container.

The present invention provides a mold apparatus for molding the radially inwardly extending lugs from the skirt portion of the caps. The invention further provides a cap construction manufactured by the aforementioned inventive process.

SUMMARY OF THE INVENTION

In accordance with the present invention, there is provided an apparatus for molding a cap including a base portion and a peripheral skirt extending axially from and about the base portion. The apparatus includes an outer surface mold for forming an outer surface of the base portion and the peripheral skirt and an inner surface mold seatable within the outer surface mold for forming an inner surface of the base portion, a sealing ring, and the peripheral skirt. The outer surface mold is retractable from seated engagement with the inner surface mold for exposure of the molded cap therebetween. The inner surface mold includes a core portion and a plurality of movable mold pins projecting axially from and retracting radially inwardly relative to the core portion for releasing and ejecting the cap from the inner surface mold means. The mold pins are positioned and dimensioned to retract without contacting the sealing ring. The core portion has an angular groove for molting the sealing ring with a smooth continuous surface.

Further, the present invention provides a cap member including a base portion and peripheral skirt extending axially from and about the base portion. A plurality of spaced lugs extend radially inwardly from the peripheral skirt. The skirt includes an edge having inner wall portions alternating with slightly recessed portions of the inner surface, the lugs extending inwardly from the slightly recessed portions.

FIGURES IN THE DRAWING

Other advantages of the present invention will be readily appreciated as the same becomes better understood by reference to the following detailed description when considered in connection with the accompanying drawings wherein.

DETAILED DESCRIPTION OF THE INVENTION

Figure 1:
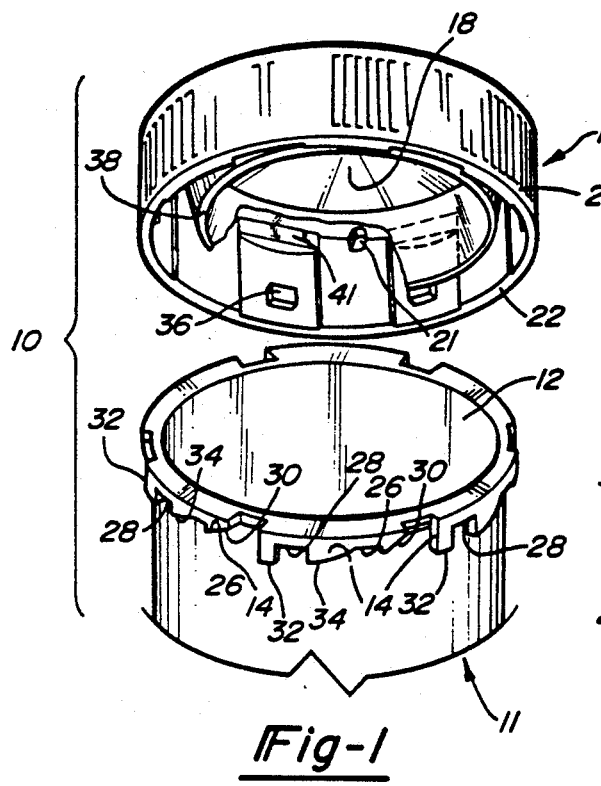
FIG. 1 is an exploded view of a safety closure container assembly and cap of the present invention, with FIG. 2 is bottom view of the cap.

A safety closure and container assembly constructed in accordance with the present invention is shown at 10 in FIG. 1. The assembly 10 includes a container generally designated at 11 having a neck or mouth 12 within an annular rim 14.

Figure 2:
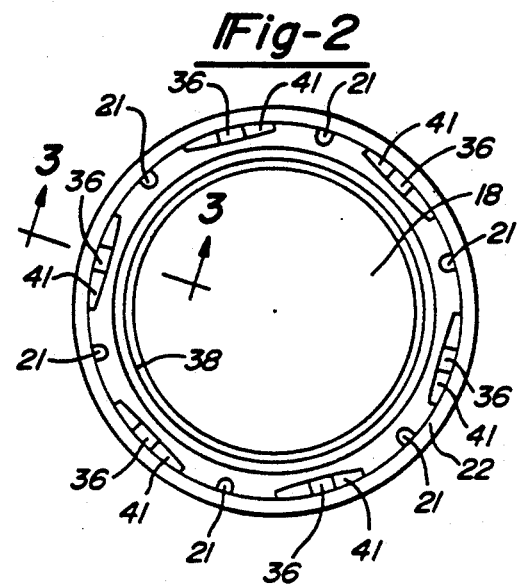

The assembly 10 includes a cap 16 integrally molded from a polymer such as polypropylene. The cap 16 includes a relatively stiff base portion 18 with a peripheral skirt or flange 20 projecting axially therefrom for receiving the mouth 12 of the container 10. The skirt 20 has an outer end 22 opposite the base portion 18. As shown in FIG. 2, a plurality of stops 21 are formed to extend inwardly from the base portion 18 and the skirt 20 to strengthen the base portion and to prevent over insertion of the container into cap.

Formed on an outer surface of the mouth portion 12 of the container 10 is a plurality of container locking elements generally indicated at 24 of the bayonet type which are spaced peripherally from each other on the outer surface of the mouth 12. Each container locking element 24 includes a pair of sockets or first and second notches 26,28, respectively. The first notch 26 is formed between a cam surface 30 and a depending stop portion 32. The second notch 28 is formed between the cam surface 30 and a second cam surface 34.

A plurality of cap locking elements in the form of bayonet lugs 36 are spaced peripherally from each other and project radially inwardly from the inner surface of the skirt 20. The lugs 36 are integrally molded with the skirt 20. The lugs 36 act as a bayonet locking mechanism in the sense that the lugs cooperate in bayonet fashion with the container locking elements 24. The cap locking elements or lugs 36 are complementary to the container locking elements 24, such that the cap locking elements are engageable with the second and first notches 28, 26, respectively, by relative axial motion of the cap 16 towards the container 10 followed successively by rotative motion of the cap 16 relative to the container 10.

The cap 16 is biased against the axial movement from the locked engagement with the container 10 and a liquid and moisture seal is maintained for the contents of the container 10 by a spring like sealing portion 38 and spring like annular biasing portion 40, both of which are formed integrally with outer annular base portion 18. The more particular structure and function of the sealing portion 38 and biasing portion 40 are disclosed in detail in U.S. Pat. No. 4,444,327 to applicant and incorporated by reference herewith.

Figure 3:
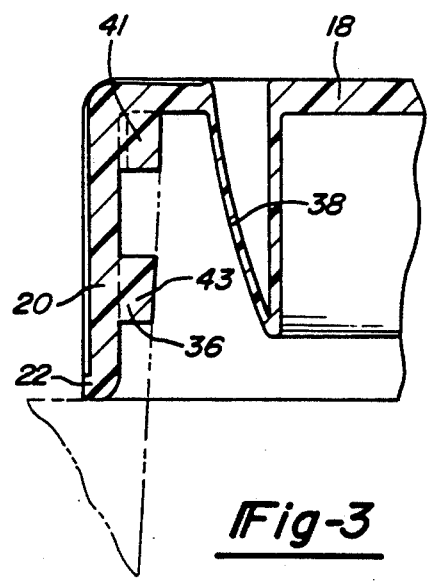
FIG. 3 is a partial cross sectional view of the cap taken along lines 3—3 of FIG. 2.

The interior surface of the skirt 20 includes interior wall portions 39 alternating with pin mold portions 40 from which extend lugs 36. As shown in FIG. 3, each lug 36 is formed with an outer face 43 which is angled with respect to the pin mold portion. The pin mold portions are formed by a lug forming mold pins 58 (FIGS. 5–7) which form the lug 36. The pin mold portions extend from the end to a bar portion 41. (FIGS. 2–3).

Figure 5:
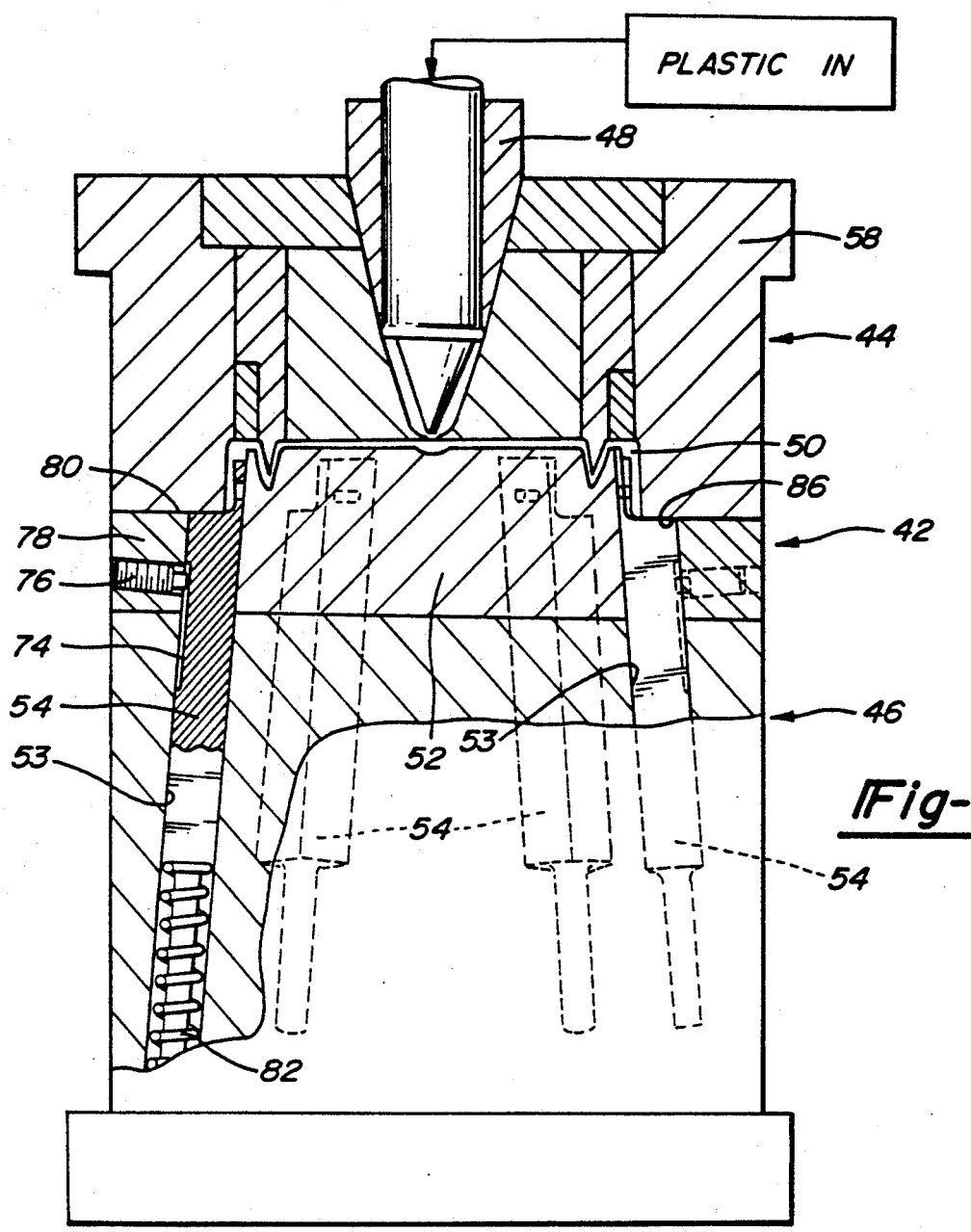
FIG. 5 is a fragmentary cross sectional view of the molding apparatus showing the mold pins for releasing a molded cap therefrom.

An apparatus for molding the cap 16 including the base portion 18 and the peripheral skirt extending axially from and about the base portion 18 is generally shown at 42 in FIG. 5. The apparatus 42 includes a retractable upper mold half generally indicated at 44 seatable over a lower fixed mold half 46. The upper mold half 44 includes a polymer injection nozzle 48 for injecting polymer into a cavity 50 formed between the seated mold halves 44, 46. The retractable mold half 44 is retractable from seated engagement with the fixed inner surface mold half 46 for exposure of the cap 16 molded therebetween within cavity 50.

Generally, the lower mold half 46 includes a core portion 52 for molding an inner surface of the cap 10 and a cap release mechanism in the form of retractable pins 54 for projecting axially from and retracting radially inwardly relative to the core portion 52 for releasing and ejecting the molded cap 16 from the inner surface forming mold 46. An annular groove 55 extends into the core portion for forming the sealing portion 38 of the cap.

Figure 7:
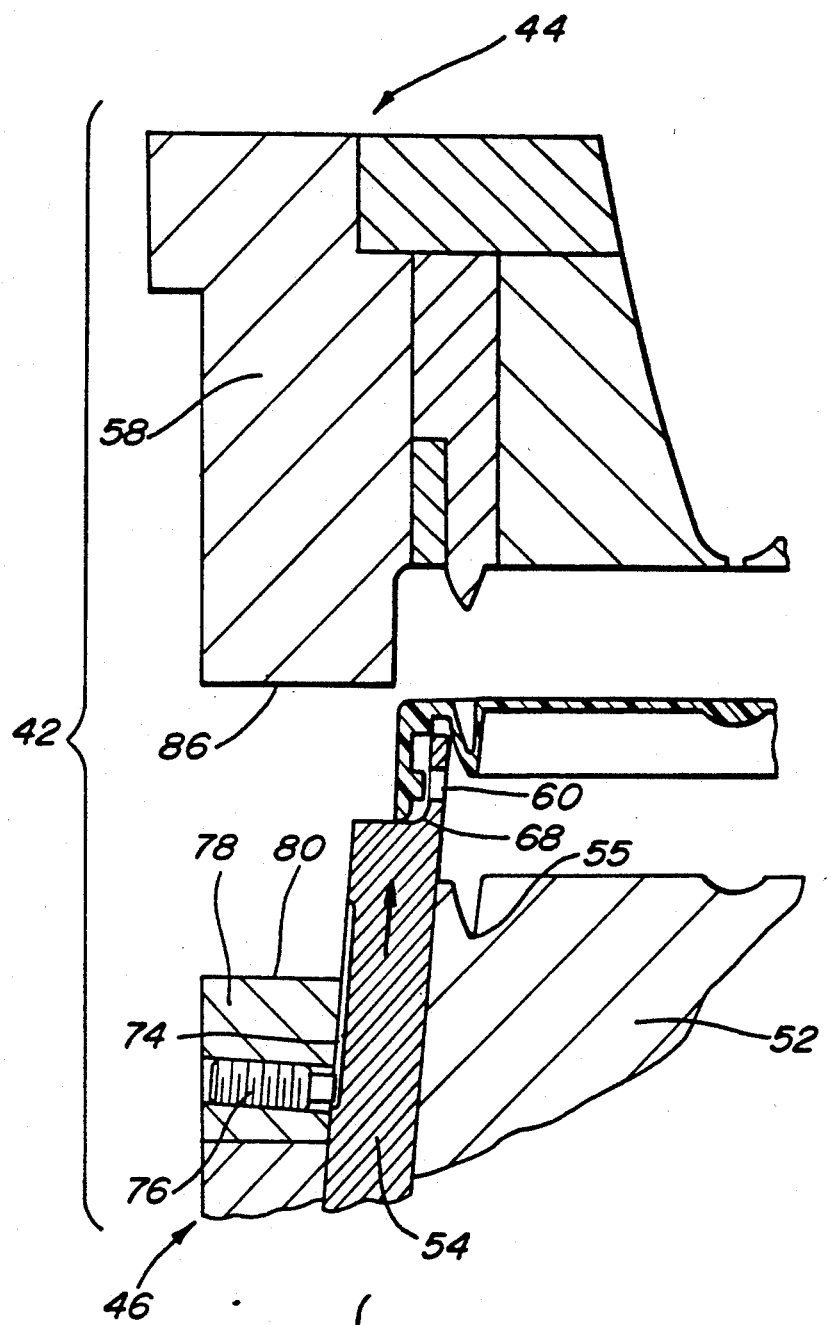
FIG. 7 is an exploded partial sectional view of the mold apparatus and cap with the mold pin extended to release the cap.
Figure 8:
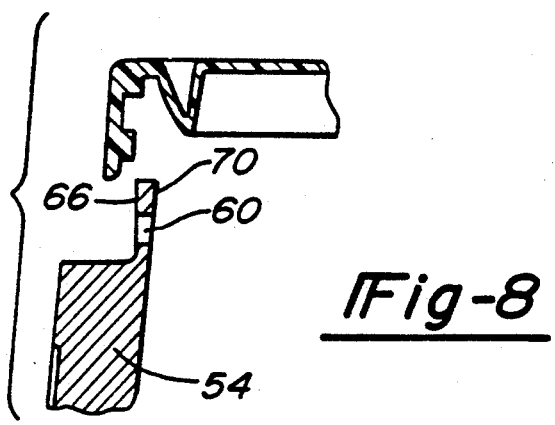
FIG. 8 is a partial sectional view of the mold finger and cap after release.

More specifically, the core portion 52 has a radially extending peripheral surface 56. The cap release mechanism includes a plurality of lug forming mold pins spaced about the radial peripheral surface 56 of the core portion 52. Each lug forming mold pin 54 is retractable and seated within a channel 53 formed between the core portion 52 and an outer old housing 58. The lug forming mold pins 54 are moveable axially and radially inwardly within the channels 53. The pins are moveable from a seated position, as shown in FIG. 5, to raise and eject a molded cap 16 from the core portion 52. The pins move radially inwardly from the molded cap 16 to release the lug forming mold pins 54 from the formed lugs 36 in the molded cap 16 as shown in FIGS. 7 and 8.

Figure 4:
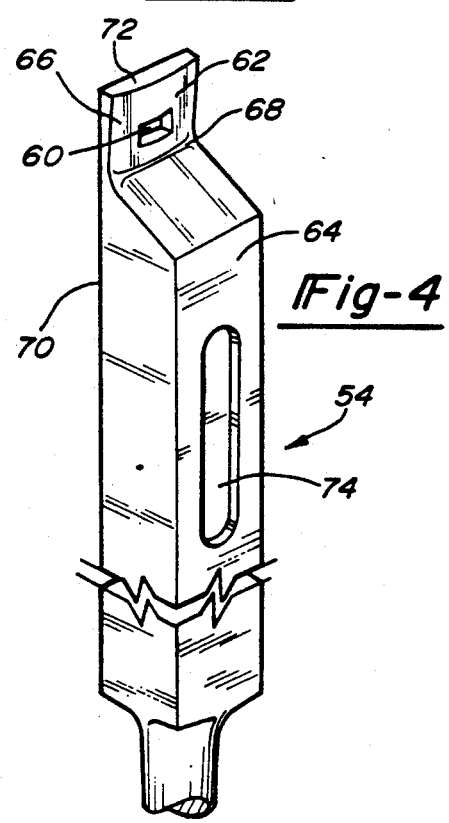
FIG. 4 is a perspective partial view of a mold pin according to the invention.

As shown in FIG. 4, each of the lug forming mold pins 54 include a head portion 62 having a lug forming recess 60 extending from a generally rectangular body 64. The head portion 62 includes a curved mold surface 66 extending to a shoulder 68. The curved mold surface 66 has a radius of curvature which is generally equal to the radius of the inner surface of the skirt of the cap 16. Because rear surface 70 slides in the channel 53 of the lower mold half, the axis of the curved mold surface 64 is angled with respect to a rear surface 70 of the pin so that the recessed portion of the cap is formed parallel to the outer surface of the peripheral skirt. Thus, the thickness of the head at the shoulder is less than the thickness of the head at the free end 72 of the pin. The overall thickness of the head between the mold surface 64 and the rear surface 70 is quite thin, for instance, 0.040 to 0.046 inches to permit the pin to be withdrawn from the cap without engaging the sealing portion 38 of the cap, after the cap has been moved away from the core as shown in FIGS. 7–8. However, the head portion must have sufficient thickness to form the lug 36 within the recess 60. The lug must be sufficiently long, for instance 0.042 inches, to engage the notches 26 and 28 of the locking elements. The recess 60 is spaced apart from an end of the pin such that the distance between the lug 36 and the bar 41 of the cap is great enough to accept the cam surfaces 34 of the locking elements.

Figure 6:
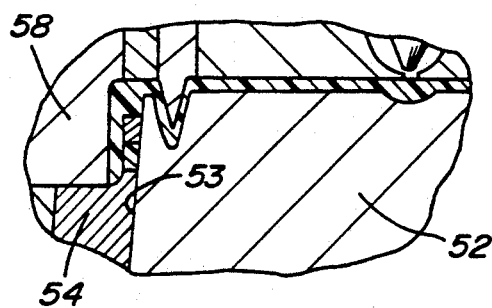
FIG. 6 is a fragmentary cross sectional view of the mold apparatus and cap as it is molded.

The shoulder 68 is shaped to form a portion of the outer end 22 of the peripheral skirt as best shown in FIG. 6. The body of the pin 54 has a groove 74 extending longitudinally on the body of the pin to engage a stop member 76 mounted in the ring 78 to limit the travel of the pins in the grooves of the core portion 52.

As the pins 54 move upwardly and angle inwardly, the head portion 62 which includes the lug forming recess 60 moves in two vectors. It is moved in an upward vector forcing the molded cap 16 upwardly. The head portion 62 also moves in an radially inward vector thereby unseating the formed lug portion 36 from the recess 60 such that the cap member 16 can be released from the head portion 62. Otherwise, if the pins 54 move solely in an upward direction, the lugs 36 would remain seated in the recesses 60 and would have to be otherwise forced therefrom. The groove 74 and stop member 76 prevent the retractable pins 54 from over extending and contacting the sealing portion 38 of the cap. Any contact of the pins 54 with the sealing portion would deform the surface of the sealing portion and decrease the ability of the cap to seal the vial.

The mold apparatus 42 includes means operatively connected to the lug forming mold pins 54 for forcing the end 22 of the peripheral skirt 20 of the molded cap 16 from the core portion 52 axially relative thereto as the lug forming mold pins 54 move axially and angle radially inwardly. The ring member 78 cooperates with the shoulder portions 68 of the pins for providing the means for axial displacing the cap member 16. The ring member 78 has a top surface 80 defining a mold surface for forming and abutting against the end 22 of the peripheral skirt 20 whereby movement of the ring member 78 with the retractable pins 54 axially displaces the molded cap from the inner surface mold half 46. As the ring member 78 moves in a single axially upward vector relative to the core portion 52, the pins 54 move both upwardly and inwardly away from the peripheral skirt 20 and lugs 36. Thus, the head portions 62 of the lug forming mold pins 54 release the cap member 16 molded thereon and the ring member 78 axially displaces the cap 16 therefrom as the top surface 80 of the ring member 70 abuts against the end 22 of the skirt 20 of the cap 16. Thus, the molded cap 16 is released from and ejected from the lower mold half 46.

As briefly described above, the core portion 52 includes an outer surface 56 having a plurality of channels angling radially inwardly relative to the remainder of the core portion 52. The inner surfaces 70 of the pins are in sliding engagement with the channels. The apparatus 42 includes spring members 82, as shown in FIG. 5, disposed within the channels and engaging a bottom surface 84 of the lug forming mold pins 54 to force the lug forming mold portions 54 to extending axially and angle radially inwardly from the channels when the retractable outer surface mold 44 is unseated from the inner surface mold 46. More specifically, the outer surface mold half 44 includes a bottom surface 86 which engages the top surface 80 of the ring member 78 when seated over the inner surface mold half 46 for forcing the lug forming mold pins 54 back into the channels. Thus, once the cap is molded, the retractable outer surface mold half 55 is unseated and retracted from the inner surface mold half 46. As the outer surface mold half 44 is retracted, the spring 82 biases the lug forming mold pins 54 axially upwardly and inwardly, the lug forming mold pins 44 axially engaging the pin 76 to displace the ring member 78. The ring member 78 then axially displaces the cap 16 from the core portion 52 as the end portion 72 of the lug forming mold pin 54 move upwardly and inwardly thereby releasing the formed lugs 36 from the recesses 60.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An apparatus for molding a cap having a peripheral skirt having plurality of lugs extending from said skirt and a sealing portion extending coaxially with said skirt, said apparatus comprising:
   an outer surface mold;
   an inner surface mold sealable within the outer surface mold;
   means for injecting polymer into a cavity formed by said outer surface mold and said inner surface mold, said cap being formed within said cavity; and
   means for forming said plurality of lugs and releasing said cap from said inner surface mold means, said means for forming including a plurality of mold pins, having a mold surface for forming an inner portion of said peripheral skirt and a recess for forming said lug, each of said plurality of mold pins having a rear surface opposite said mold surface and being spaced apart from said sealing portion to prevent contact with the said sealing portion during the molding of said cap, said means for forming further including means for extending said pins axially with respect to said inner surface mold and retracting said pins inwardly away from said skirt to release said cap from said inner surface mold.

2. The apparatus of claim 1 wherein said rear surface of each of said pins is axially slidable in a channel formed in said inner surface mold.

3. The apparatus of claim 1 wherein said mold surface of said pin is angled with respect to said rear surface.

4. The apparatus of claim 1 wherein each of said pins further comprises a shoulder for molding a portion of an end of said cap.

5. The apparatus of claim 1 further comprising means for stopping the axial extension of said plurality of pins.

6. The apparatus of claim 1 wherein said inner surface mold further comprises a core member having a continuous annular groove for forming said sealing portion on said cap.

7. The apparatus of claim 6, wherein said inner surface mold further comprises a plurality of channels, each of said channels formed to slidably accept a respective one of said plurality of mold pins, said plurality of channels being spaced apart from said continuous annular groove.

* * * * *